United States Patent
Mazzacano et al.

(10) Patent No.: US 8,245,723 B2
(45) Date of Patent: Aug. 21, 2012

(54) FLUID CONVEYANCE AND/OR DISTRIBUTION DEVICE WITH RING NUT COUPLING

(75) Inventors: Corrado Mazzacano, Genoa (IT); Andrea Bisio, Genoa (IT)

(73) Assignee: F.I.P. Formatura Iniezione Polimeri S.p.A., Casella, Genoa (IT)

( * ) Notice: Subject to any disclaimer, the term of this patent is extended or adjusted under 35 U.S.C. 154(b) by 461 days.

(21) Appl. No.: 12/500,833

(22) Filed: Jul. 10, 2009

(65) Prior Publication Data

US 2010/0025611 A1 Feb. 4, 2010

(51) Int. Cl.
*F16K 43/00* (2006.01)

(52) U.S. Cl. ......... 137/315.41; 137/315.18; 251/315.01; 251/315.1

(58) Field of Classification Search ............ 251/142, 251/149, 152, 315.1–315.14; 137/15.08, 137/15.09, 15.22, 315.18, 315.41, 327, 328, 137/798; 285/38–39, 377, 306
See application file for complete search history.

(56) References Cited

U.S. PATENT DOCUMENTS

| | | | | |
|---|---|---|---|---|
| 977,472 | A * | 12/1910 | Pilkington | 285/39 |
| 2,907,242 | A * | 10/1959 | Chakroff | 81/57.15 |
| 3,550,902 | A * | 12/1970 | Vanegas et al. | 251/151 |
| 4,103,865 | A * | 8/1978 | Nanba et al. | 251/148 |
| 4,566,489 | A * | 1/1986 | Knapp et al. | 137/614 |
| 4,605,199 | A * | 8/1986 | Bonissone et al. | 251/171 |
| 4,625,624 | A * | 12/1986 | Adams | 91/375 A |
| 4,667,928 | A * | 5/1987 | Davatz et al. | 251/315.13 |
| 5,090,447 | A * | 2/1992 | Lewis et al. | 137/559 |
| 5,836,352 | A * | 11/1998 | Nimberger | 137/614.19 |
| 5,924,341 | A * | 7/1999 | Brooks | 81/58.2 |
| 7,306,010 | B2 * | 12/2007 | Gruener, Sr. | 137/797 |
| 2002/0101076 | A1 * | 8/2002 | Barrier | 285/91 |
| 2006/0180218 | A1 | 8/2006 | Gruener, Sr. | |
| 2008/0169441 | A1 * | 7/2008 | Beebe | 251/248 |

FOREIGN PATENT DOCUMENTS

| | | |
|---|---|---|
| DE | 872899 | 4/1953 |
| EP | 0607770 | 7/1994 |
| EP | 1452789 | 9/2004 |

* cited by examiner

*Primary Examiner* — John Fristoe, Jr.
*Assistant Examiner* — Matthew W Jellett
(74) *Attorney, Agent, or Firm* — Shoemaker and Mattare

(57) ABSTRACT

A device for conveying and/or distributing fluids comprises a housing with connection portions, one or more threaded ring nuts that can be screwed to the connection portions in order to join them, a control handle and a tightening seat formed in the housing and adapted to support the control handle in a tightening position, rotatable around a tightening axis. The control handle comprises a drive portion which, in the tightening position, engages with a coupling portion of the ring nut, in a manner such that a rotation of the control handle around the tightening axis leads to a screwing or an unscrewing of the ring nut.

17 Claims, 5 Drawing Sheets

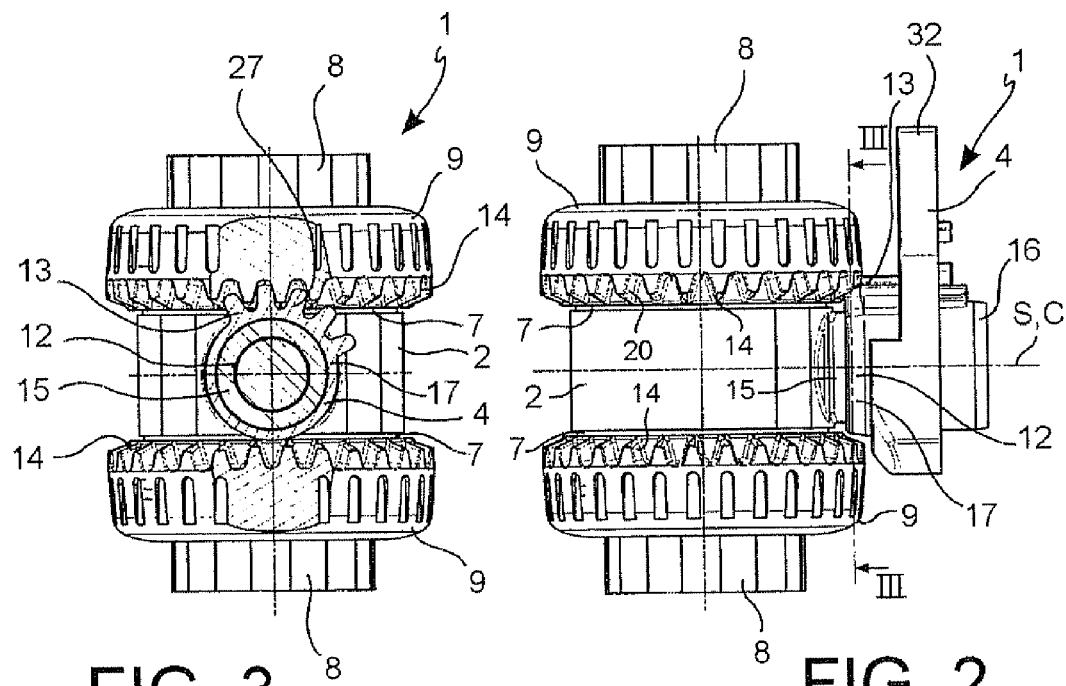
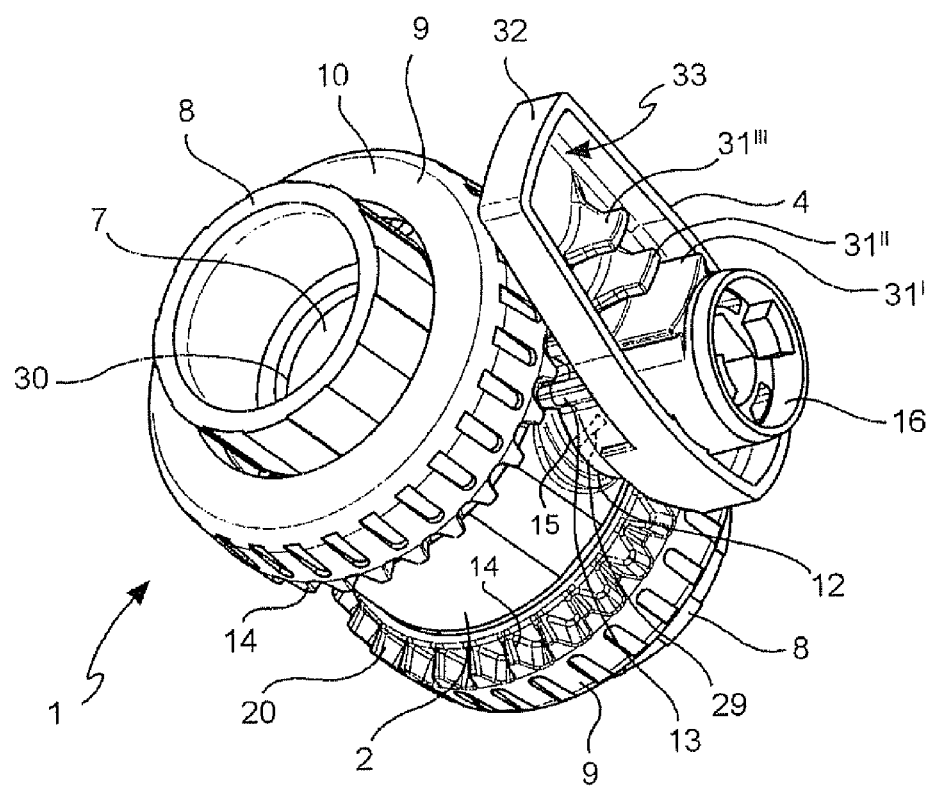

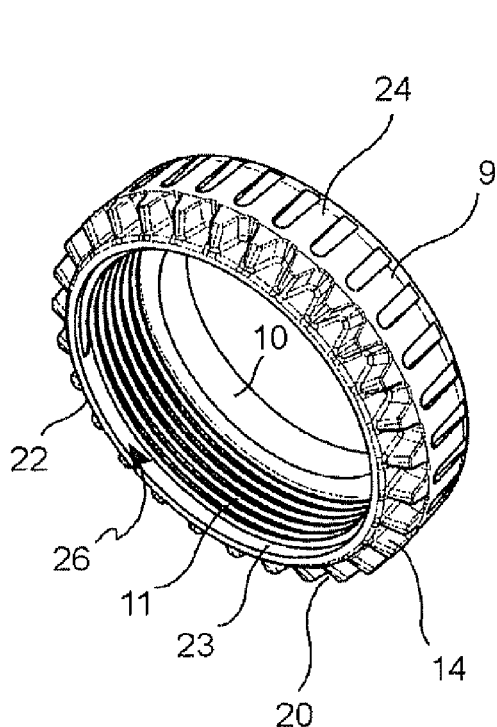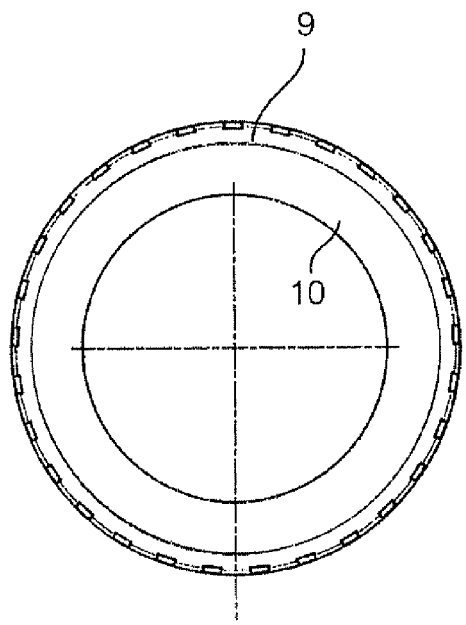# FIG. 13
FIG. 14
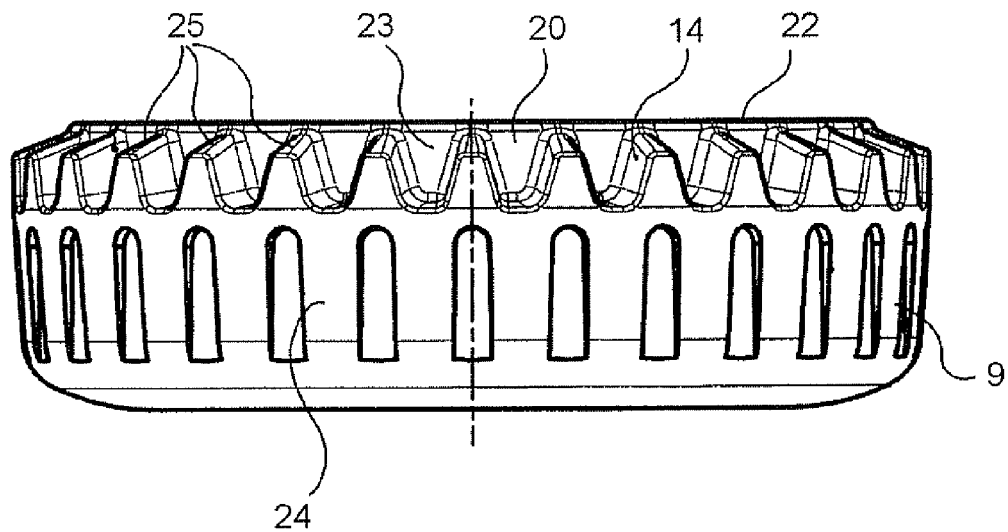
FIG. 15

FLUID CONVEYANCE AND/OR DISTRIBUTION DEVICE WITH RING NUT COUPLING

The present invention refers in general to a fluid conveyance and/or distribution device with ring nut coupling and in particular to a hydraulic valve with ring nut coupling, for example in fluid conveyance and distribution systems.

In order to optimise and economise the production of fluid conveyance and distribution systems, for example hydraulic circuits, provided with pipes and valves of various types, for example distribution valves, control valves, exhaust valves, damping valves, delivery valves or selector valves, the valves are integrally produced independent of the piping and connected thereto only at the time of assembly of the hydraulic circuit.

During the assembly, for example of a hydraulic circuit, the valves and piping are connected to each other so as to allow the execution of the desired functions.

For such purpose, the valve usually comprises an externally threaded coupling portion and a ring nut with inner threading, adapted to be screwed on the coupling portion in order to maintain one end of a pipe in engagement with this coupling portion.

This connection type has the disadvantage that both the tightening of the ring nut during assembly and the loosening of the ring nut during maintenance or substitution of the valve require a specific space around the ring nut in order to be able to grasp it with the hand or with a tightening tool. Nevertheless, this need for space for mounting and dismantling the flow valves and flow control devices in general is hard to reconcile with the very narrow spaces of the industrial plants, civilian or military, where the fluid conveyance and distribution systems are integrated. Indeed, in most plants, the only freely accessible part of a valve is its control portion, for example a handle for adjusting the flow through the valve. It is the control handle itself which further blocks access to the coupling ring nuts.

The object of the present invention is therefore that of proposing a fluid conveyance and/or distribution device, for example a valve, provided with at least one ring nut coupling portion and a control member, having characteristics such to allow the tightening and/or loosening of the ring nut in limited space conditions.

Such object is achieved by means of a fluid conveyance and/or distribution device, for example a valve, comprising:

a housing with one or more tubular connection portions that are removably connectable with corresponding connection portions of a fluid conveyance and/or distribution system, one or more threaded ring nuts that can be respectively screwed to one of the connection portions, in order to join said connection portions, a control handle of said device, wherein said housing forms a tightening seat adapted to support the control handle in a tightening position, rotatable around a tightening axis, said control handle comprises a drive portion that, in said tightening position, engages a coupling portion formed in the ring nut, such that a rotation of the control handle around the tightening axis leads to a screwing or unscrewing of the ring nut, depending on the rotation direction.

In accordance with one aspect of the present invention, the device also comprises a control seat adapted to support said control handle in a control position different from said tightening position and rotatable around a control axis, wherein, in the control position, the control handle does not engage the coupling portion of the ring nut and interacts with the device so as to affect the fluid passage, wherein, in the tightening position, the control handle does not affect the fluid passage.

In order to better comprehend the invention and appreciate its advantages, several exemplifying and non-limiting embodiments are described below, with reference to the attached drawings, in which:

FIG. 1 is a perspective view of a device (with control handle in tightening position) according to one embodiment of the invention;

FIG. 2 is a side view of the device in FIG. 1;

FIG. 3 is a top view of the device, in partial section along the line III-III of FIG. 1;

FIG. 13 is a perspective view of a ring nut of the device according to one embodiment of the invention;

FIG. 14 is a top view of the ring nut of FIG. 8;

FIG. 15 is a side view of the ring nut of FIG. 8.

Figure 4:
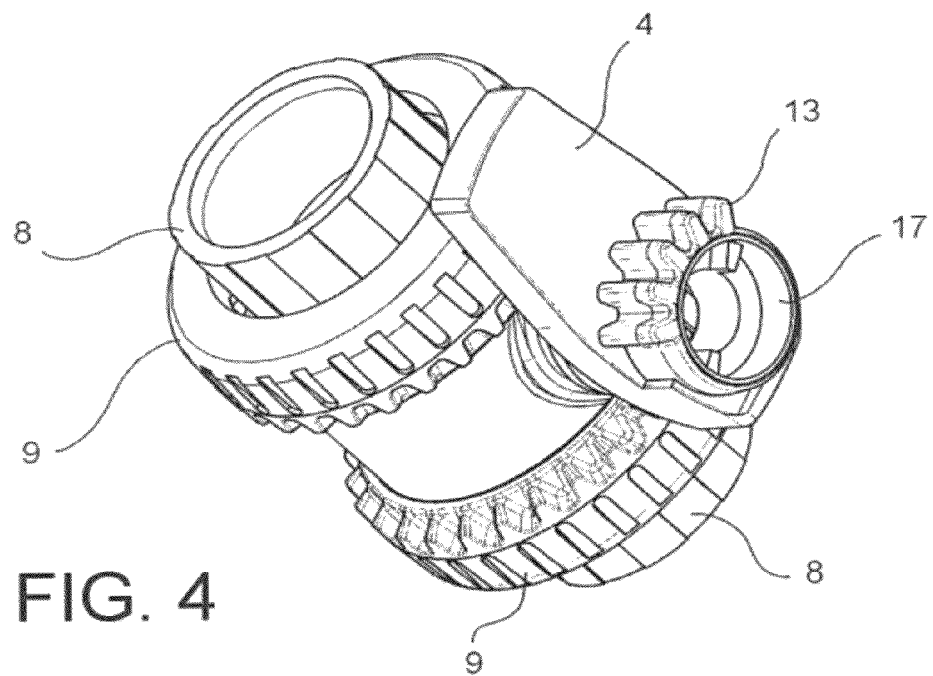
FIG. 4 is a perspective view of a device (with control handle in control position) according to one embodiment of the invention.
Figure 7:
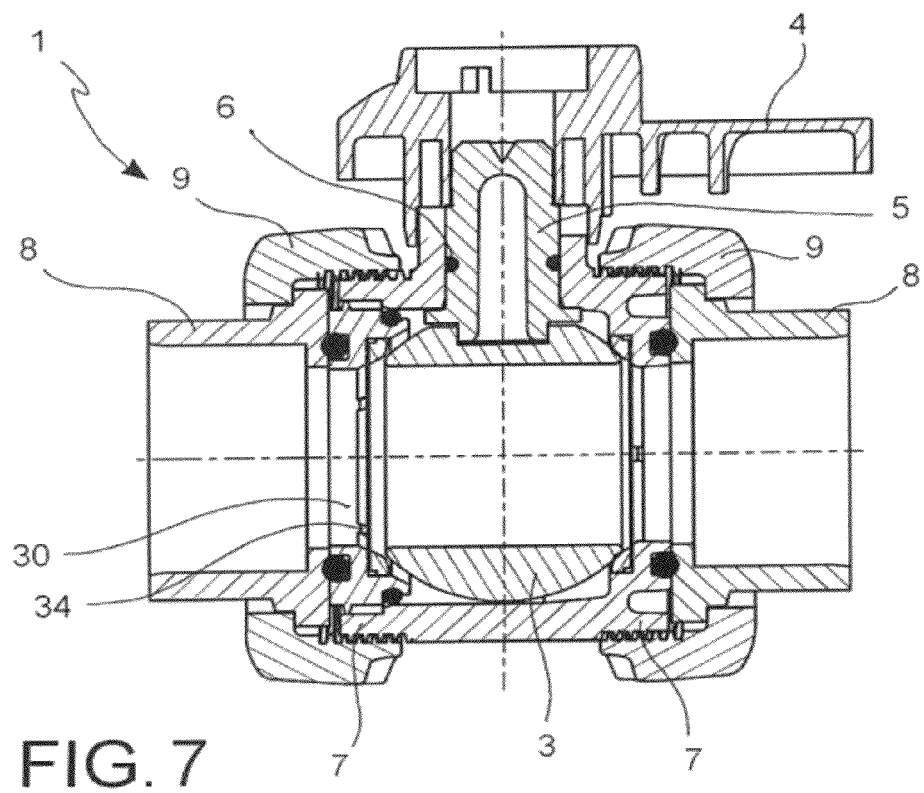
FIG. 7 is a longitudinal section view of the device according to one embodiment.
Figure 5:
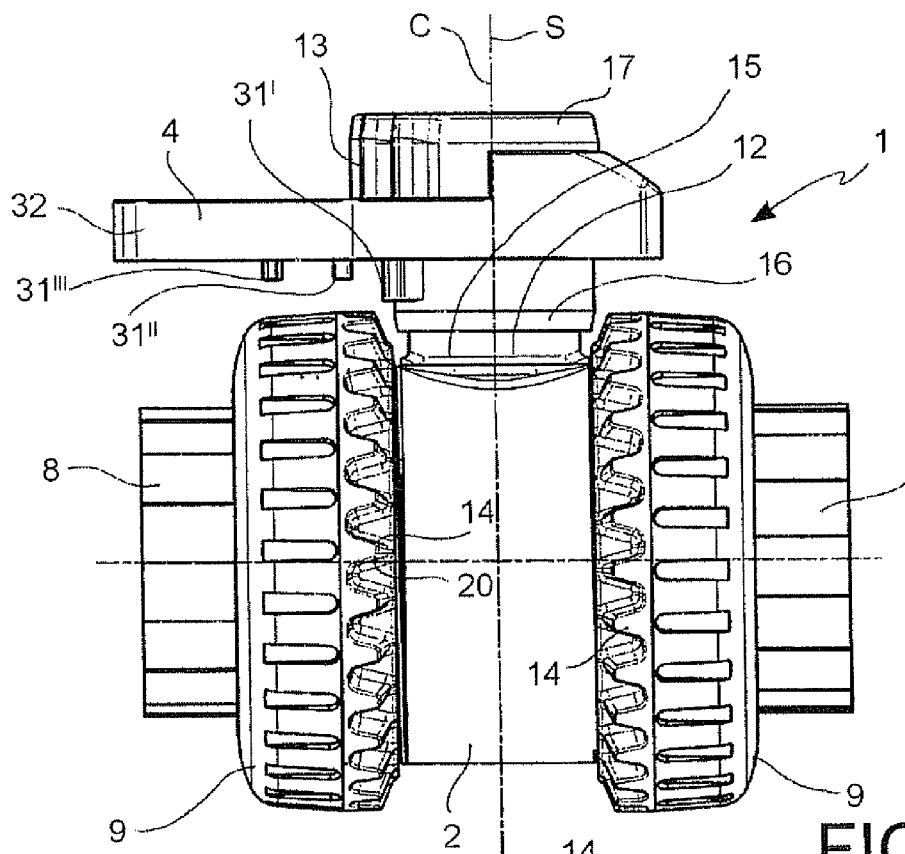
FIG. 5 is a side view of the device of FIG. 4.
Figure 6:
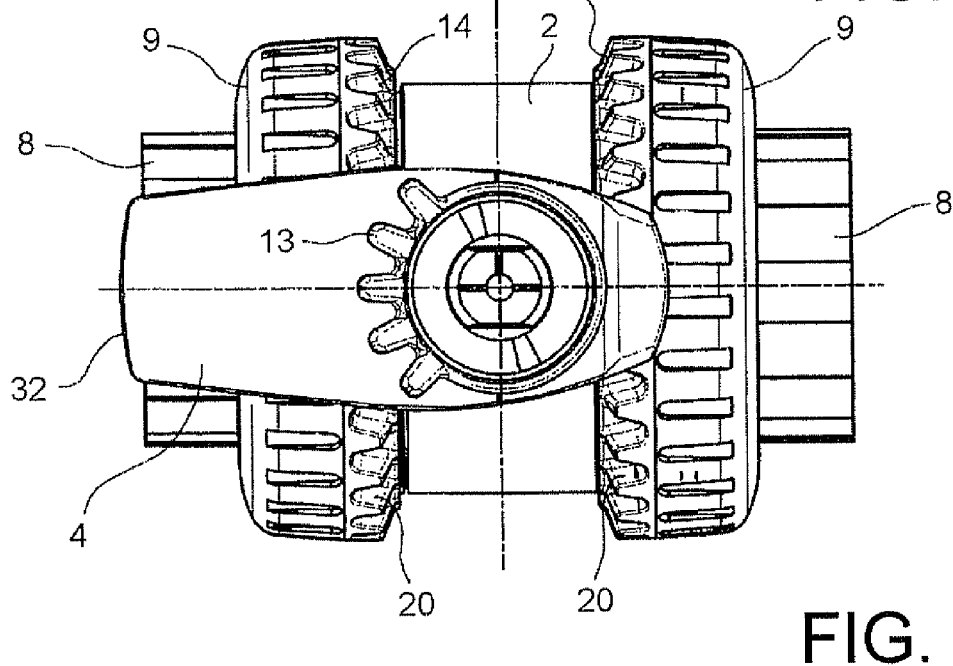
FIG. 6 is a top view, in partial section, of the device of FIG. 4.
Figures 10, 11, 12:
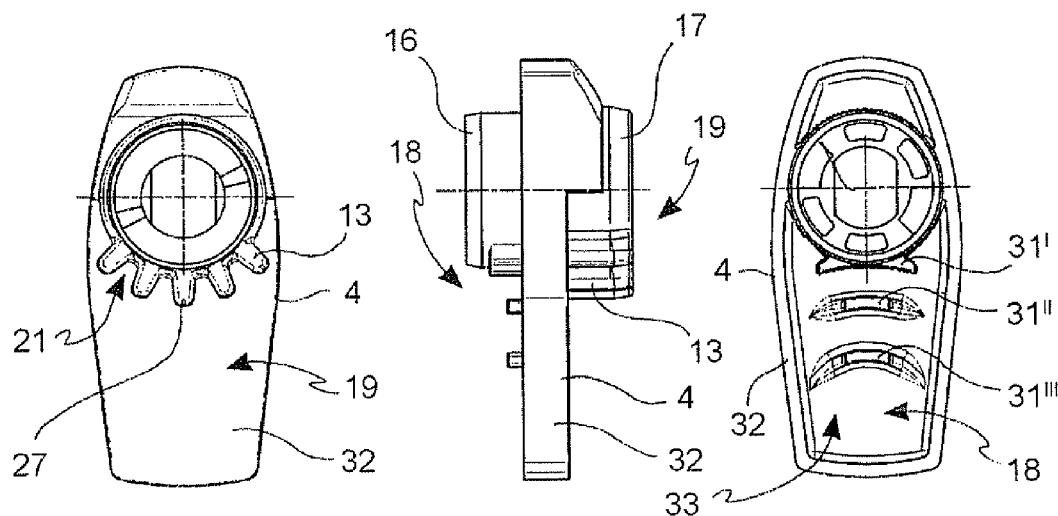
FIG. 10 is a side view of the control handle of FIG. 8.
FIG. 11 is a top view of the control handle of FIG. 8.
FIG. 12 is a bottom view of the control handle of FIG. 8.
Figures 8, 9:
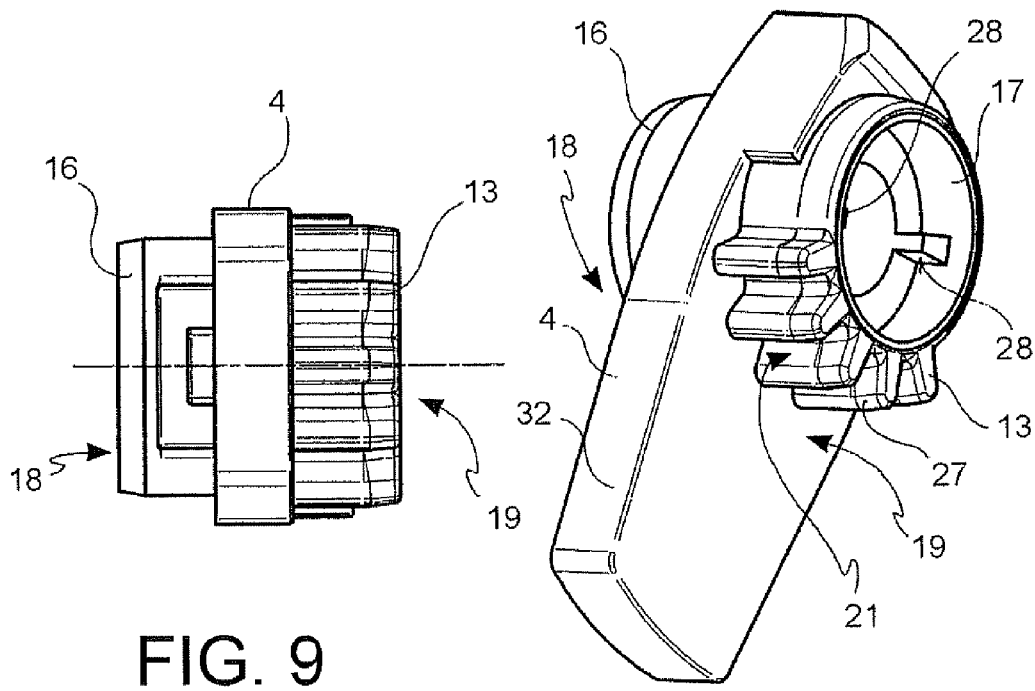
FIG. 8 is a perspective view of a control handle of the device according to one embodiment of the invention.
FIG. 9 is a rear view of the control handle of FIG. 8.

With reference to the figures, a fluid conveyance and/or distribution device, for example a valve, is indicated overall with the reference number 1. As a non-limiting example, one such valve can comprise a valve body or housing 2, a shutter 3 arranged inside the valve body 2, a control handle 4 rotatably connectable with a support portion or "tower" of the housing 2 and adapted to position the shutter 3 by means of a drive shaft 5 arranged in a suitable passage 6 of the housing 2. The shutter 3, depending on its operative position, affects (for example adjusts, blocks, divides or distributes) a flow, for example a liquid which crosses the valve or more generally the device 1.

In accordance with a general embodiment of the invention, the device 1 comprises a housing 2 with one or more connection tubular portions 7, removably connectable with corresponding portions 8 of a fluid conveyance and/or distribution system, for example a piping system. The connection portions 7, 8 of the device 1 and of the piping system are connectable with each other due to one or more ring nuts 9 that can be coupled with one of the connection portions 7, 8 and screwed with the other connection portion 7, 8. As an example, the ring nut 9 can comprise a shoulder 10 which engages a flange (not visible in the figures) of a pipe and an inner thread 11 that can be screwed on a corresponding outer thread of the tubular connection portion 7 of the device 1.

The device 1 also comprises a control handle 4 and a tightening seat 12 arranged at the housing 2 or formed therein and adapted to support the control handle 4 in a tightening position wherein the handle 4 is rotatable around a tightening axis S.

The control handle 4 comprises a drive portion 13 which, in tightening position, engages with a coupling portion 14 formed in the ring nut 9 or connected thereto, such that a rotation of the control handle 4 around the tightening axis S leads to a screwing or unscrewing of the ring nut 9, depending on the rotation direction.

Due to the engagement between the handle 4 in tightening position and the ring nut 9, the latter can be tightened or loosened (at least in the final screwing section on the connection portion 7) by means of the handle 4, thus overcoming the need to grasp the ring nut manually or through a suitable tightening device. In such a manner, the device 1 can be easily mounted and dismantled in a fluid conveyance and distribution system in limited space conditions.

In accordance with the general inventive idea, the control handle 4 can carry out as its only function the screwing and unscrewing or at least the loosening and tightening of the ring nuts 9, for example if the device 1 does not provide for any manual drive or control function of the fluid flow.

In accordance with a further development of the invention, the device 1 is manually drivable or adjustable (for example a valve for adjusting the flow of a liquid) and comprises a control seat 15 adapted to support the control handle 4 in a control position different from the tightening position and wherein such control handle 4 is rotatable around a control axis C. The control seat 15 and the control handle 4 are configured in such a manner that:

in the control position, the control handle 4 does not engage the coupling portion 14 of the ring nut 9 and interacts instead with the device 1, for example the drive shaft 5 and the shutter 3, such that a rotation of the handle 4 around the control axis C affects the passage of fluid through the device 1;

in the tightening position, a rotation of the control handle 4 around the tightening axis S does not affect the fluid passage.

This allows the use of a single control handle 4 both for tightening and loosening the ring nuts 9 and for driving the device 1, depending on its application position on the device 1, without the two functions of the handle 4 affecting each other.

In accordance with one embodiment, the tightening seat 12 is arranged near the control seat 15 in order to allow the unscrewing and screwing of the ring nuts 9 and the driving of the device 1 from a same side of the housing 2.

The tightening seat 12 and the control seat 15 can be substantially coaxial and/or composed of a same common seat 12 and, advantageously, configured in a manner such that the control axis C and the tightening axis S at least approximately coincide, preferably completely coincide.

As a non-limiting embodiment example, such tightening seat 12 and/or control seat 15 can comprise a substantially annular wall or a pin formed in the housing 2 and adapted to house and support in a rotatable manner a corresponding support portion, for example annular, tubular or cylindrical, of the control handle 4.

In accordance with one embodiment, the control handle 4 comprises a first support portion 16 for the removable positioning and fixing of the handle 4 in the control seat 15 in a control position and a second support portion 17 (preferably but not necessarily different from the first support portion 16) for the removable positioning and fixing of the handle 4 in the tightening seat 12 in tightening position. The support portions 16, 17 can be configured and positioned in the handle 4 in a manner such that:

in the control position, a control side 18 of the handle is turned towards the housing 2 and in the tightening position, a tightening side 19 of the handle, different and preferably opposite the control side 18, is turned towards the housing 2.

In case of maintenance or substitution of a valve, due to the aforesaid configuration, the control handle 4 (which up to this point was turned and positioned in control position) can be detached from the valve body, simply turned with tightening side 19 towards the valve and reattached to the valve body in the same position, in order to be used as tool for loosening the ring nuts.

After maintenance, the valve can be connected, by means of the ring nuts 9, to the external connection tubes; the ring nuts can be tightened by means of a rotary movement of the handle turned in tightening position. Upon completed mounting, the handle 4 can be simply detached from the valve body, turned with the control side 18 towards the valve and reattached in the same position to the valve body, in order to be used as control handle for driving the valve.

In this manner, it is possible to utilise the same side and valve access space and the same control handle 4 both for driving the valve during its normal functioning and for mounting and dismantling during maintenance and repair operations.

In accordance with one embodiment, the coupling portion 14 of the ring nut 9 comprises a ring gear 20 and the drive portion 13 of the control handle 4 comprises a toothed section 21 which engages the ring gear 20 with control handle 4 in tightening position and ring nut 9 at least partially screwed.

The ring gear 20 can be advantageously formed in a front edge 22 of the ring nut 9 turned towards the tightening seat 12. In order to ensure high mechanical strength both of the ring nut 9 and its thread 11 as well as the ring gear 20, the ring gear 20 advantageously comprises a continuous inner annular wall 23 which is axially extended from a side wall 24 of the ring nut 9 and a series of teeth 25 radially connected (and preferably integrally formed) with the annular wall 23 and axially connected with the side wall 24 of the ring nut 9. In addition, an inner surface 26 of the annular wall 23 opposite the teeth forms an extension of the inner thread 11 of the ring nut 9.

Due to the elongation of the axial extension of the side wall of the ring nut and the extension of the thread 11, as well as of the double connection (preferably single-block) of the teeth 25 to the side wall 24 and to the inner annular wall 23, the ring nut 9, the ring gear 20 and the ring nut connection of the device 1 have high mechanical strength.

According to one embodiment, the drive portion 13 of the control handle 4 comprises a toothed sector section 27 so as to make, together with the ring gear 20 of the ring nut 9, a screwing and unscrewing sector engagement suitable for simultaneously operating on only one of the ring nuts while the other ring nut remains unchanged.

In addition, the device 1 can comprise one or more abutment surfaces 28 formed in the control handle 4 and one or more stop surfaces 29 preferably formed in the housing 2, configured so as to make one or more end stops of the screwing or unscrewing movement of the control handle 4 in the tightening position, and in particular of the tightening and loosening steps of the ring nuts.

The end stops of the tightening and loosening movement of the ring nuts ensure a movement of the handle 4 contained within space limits such to reduce the risk of injuries and undesired sliding of the handle 4.

With particular advantage, the aforesaid end stops of the screwing or unscrewing movement and the sector engagement are configured such that the unscrewing or screwing action always and only affects one of the ring nuts.

In accordance with a further embodiment, the device 1 can comprise one or more tightening rings 30 that can be screwed in the tubular connection portions 7 in order to ensure the positioning of components inside the device 1, for example seals and the shutter 3 in the case of a ball valve.

In order to overcome the need for particular tools, the control handle 4 itself can comprise a mounting portion 31 adapted to engage a tool seat 34 formed in the tightening ring 30 and a wall of the tubular connection portions 7, in order to allow the mounting and dismantling of the tightening rings 30 and the internal components of the device 1.

In accordance with one embodiment, the mounting portion 31 comprises three protuberances 31', 31", 31"', of which an inner protuberance 31"' is intended to abut against an inner surface of the tightening ring 30, an intermediate protuberance 31" is adapted to be inserted in a suitable recess (not shown) formed in the tightening ring 30 and an outer protuberance 31' is intended to abut against an outer surface of the connection portion 7.

Advantageously, the control handle 4 comprises an elongated grip portion 32 which delimits a cavity 33 and the mounting portion 31 is formed at least partially in such cavity 33. With further advantage, the cavity 33 and the mounting portion 31 are formed on the tightening side of the handle 4 and thus during the ordinary operation of the device 1 (control position) they result turned towards the housing 2 and do not impede an easy manual grip of the handle 4.

With particular reference to the exemplifying embodiment illustrated in the attached figures, the device 1 comprises two opposite tubular connection portions 7 and the tightening seat 12 is centrally arranged between the two connection portions 7, such that the control handle 4 in tightening position allows the tightening and loosening of both the ring nuts 9 associated with the two connection portions 7.

The device 1 and all its components can be at least partially made, preferably completely made of synthetic material, for example polymer material.

Of course, a man skilled in the art, in order to satisfy contingent and specific needs, can make further modifications and variants of the device 1 according to the present invention, all moreover contained in the protective scope of the invention as defined by the following claims.

The invention claimed is:

1. Device for conveying and/or distributing fluids, comprising:
a housing with one or more tubular connection portions that are removably connectable with corresponding portions of a fluid conveyance and/or distribution system,
one or more threaded ring nuts that can be screwed to said connection portions said ring nut having a coupling portion which forms a ring gear,
a control handle of said device, said control handle having a drive portion which forms a toothed section, and
a tightening seat arranged at the housing and adapted to support the control handle in a tightening position and allowing rotation of the control handle with respect to the housing around a tightening axis,
wherein, when the control handle is supported by the tightening seat in the tightening position and the ring nut is at least partially screwed on the connection portion, the toothed section of the control handle engages with the ring gear of the ring nut and a rotation of the control handle around the tightening axis leads to a screwing or an unscrewing of the ring nut, depending on the control handle rotation direction.

2. Device according to claim 1, comprising a control seat adapted to support said control handle in a control position that is different from said tightening position and rotatable around a control axis, wherein, in the control position, the control handle does not engage with said coupling portion of the ring nut and interacts with the device in a manner such that a rotation of the handle around the control axis affects the passage of fluid, and wherein, in the tightening position, a rotation of the control handle around the tightening axis does not affect the fluid passage.

3. Device according to claim 2, wherein the tightening seat is arranged near the control seat so as to allow the unscrewing and the screwing of the ring nut and the control of the device from a same side of the housing.

4. Device according to claim 3, wherein the tightening seat and the control seat are substantially coaxial and said control axis is identical with said tightening axis.

5. Device according to claim 2, wherein said control handle comprises:
a first support portion for the removable fixing of the handle to the control seat,
a second support portion for the removable fixing of the handle to the tightening seat,
a control side and a tightening side opposite the control side in a manner such that, in the control position of the handle, said control side is turned towards the housing and, in the tightening position of the handle, said tightening side is turned towards the housing.

6. Device according to claim 1, wherein the ring gear is formed in a front edge of the ring nut turned towards said tightening seat.

7. Device according to claim 1, wherein the ring gear comprises a continuous inner annular wall which is axially extended from a side wall of the ring nut and a series of teeth radially connected with the annular wall and axially connected with the side surface of the ring nut, wherein an inner surface of the annular wall opposite the teeth forms an extension of inner thread of the ring nut.

8. Device according to claim 1, wherein said drive portion of the control handle comprises a toothed sector section so as to make, together with the ring gear of the ring nut, a screwing and unscrewing sector engagement.

9. Device according to claim 1, comprising one or more abutment surfaces formed in said control handle and one or more stop surfaces formed in said housing, wherein
said abutment surfaces and stop surfaces are configured so as to make one or more end stops of the screwing or unscrewing movement of the control handle in the tightening position.

10. Device according to claim 9, wherein said one or more end stops of the screwing or unscrewing movement and said sector engagement are configured in a manner such
that the unscrewing or screwing action always and only affects one of the one or more ring nuts.

11. Device according to claim 1, comprising one or more tightening rings that can be screwed into said tubular connection portions for ensuring the positioning of internal components of the device, wherein said control handle comprises a mounting portion adapted for engaging a tool seat formed in said tightening ring as well as an inner wall of said ring and a wall of the tubular connection portion, in order to allow the mounting and dismantling of the tightening ring.

12. Device according to claim 11, wherein said control handle comprises an elongated grip portion which delimits a cavity and said mounting portion is formed in said cavity.

13. Device according to claim 12, wherein said cavity and the mounting portion are formed on the control side of the handle in a manner such that, with handle in control position, they are turned towards the housing.

14. Device according to claim 1, comprising two opposite tubular connection portions, wherein said tightening seat is centrally arranged between the two connection portions, in a manner such that the control handle in tightening position allows the screwing and unscrewing of both the ring nuts associated with the two connection portions.

15. Device according to claim 1, wherein said device is a ball valve.

16. Device according to claim 1, at least partially made of synthetic material.

17. Device of claim 1, wherein the device is a valve.

* * * * *

UNITED STATES PATENT AND TRADEMARK OFFICE
CERTIFICATE OF CORRECTION

PATENT NO. : 8,245,723 B2  
APPLICATION NO. : 12/500833  
DATED : August 21, 2012  
INVENTOR(S) : Mazzacano et al.

Page 1 of 1

It is certified that error appears in the above-identified patent and that said Letters Patent is hereby corrected as shown below:

On the title page insert

-- (30) Foreign Application Priority Data  
Jul. 30, 2008   (EP)..................... 08425523.1 --

Signed and Sealed this  
Fourth Day of February, 2014

Michelle K. Lee  
*Deputy Director of the United States Patent and Trademark Office*